Figure 1:
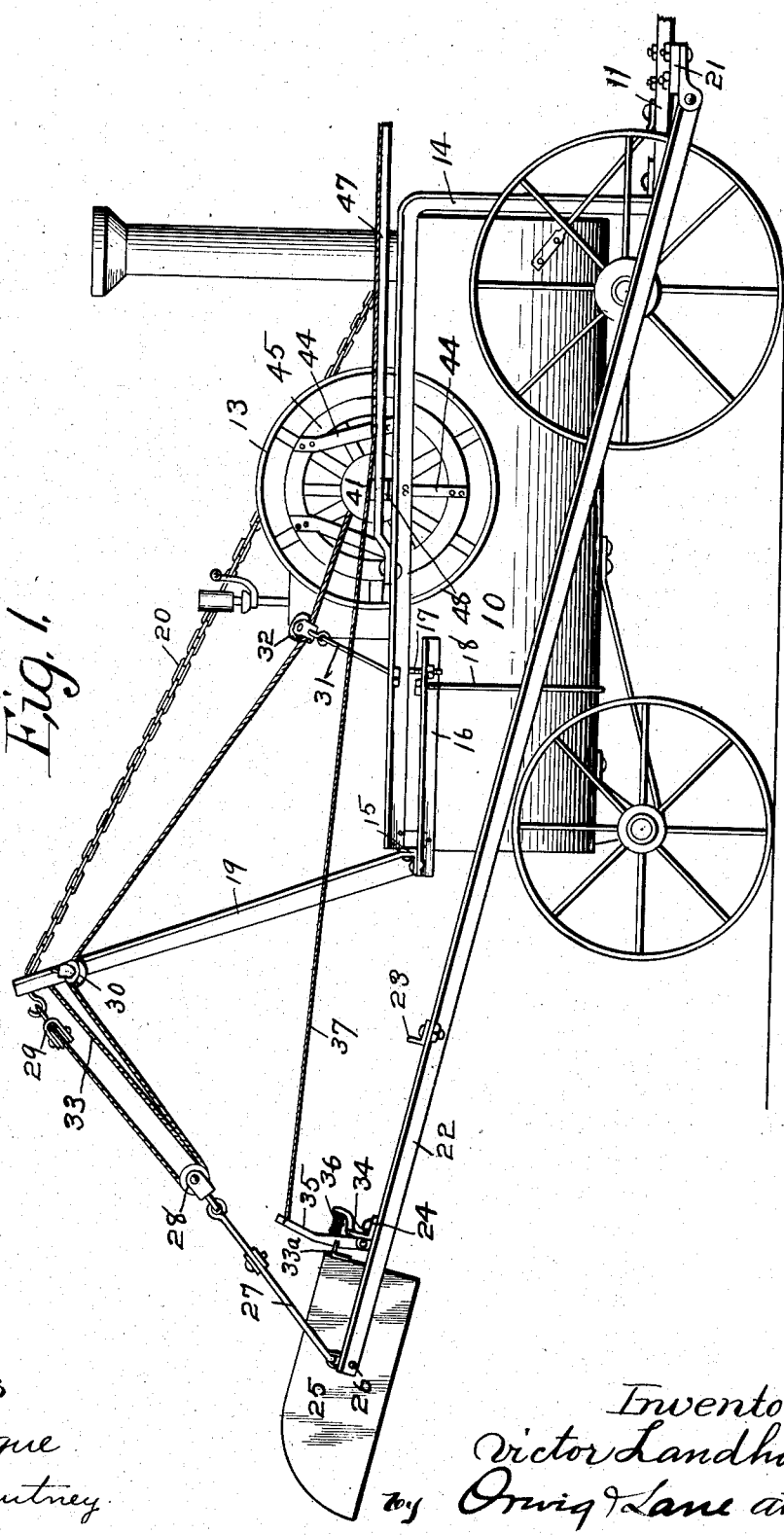

No. 878,641. PATENTED FEB. 11, 1908.
V. LANDHOLM.
LOADER.
APPLICATION FILED JAN. 14, 1907.
3 SHEETS—SHEET 1.

Witnesses
A. G. Hague
J. B. Smutney

Inventor
Victor Landholm
by Orwig & Lane attys

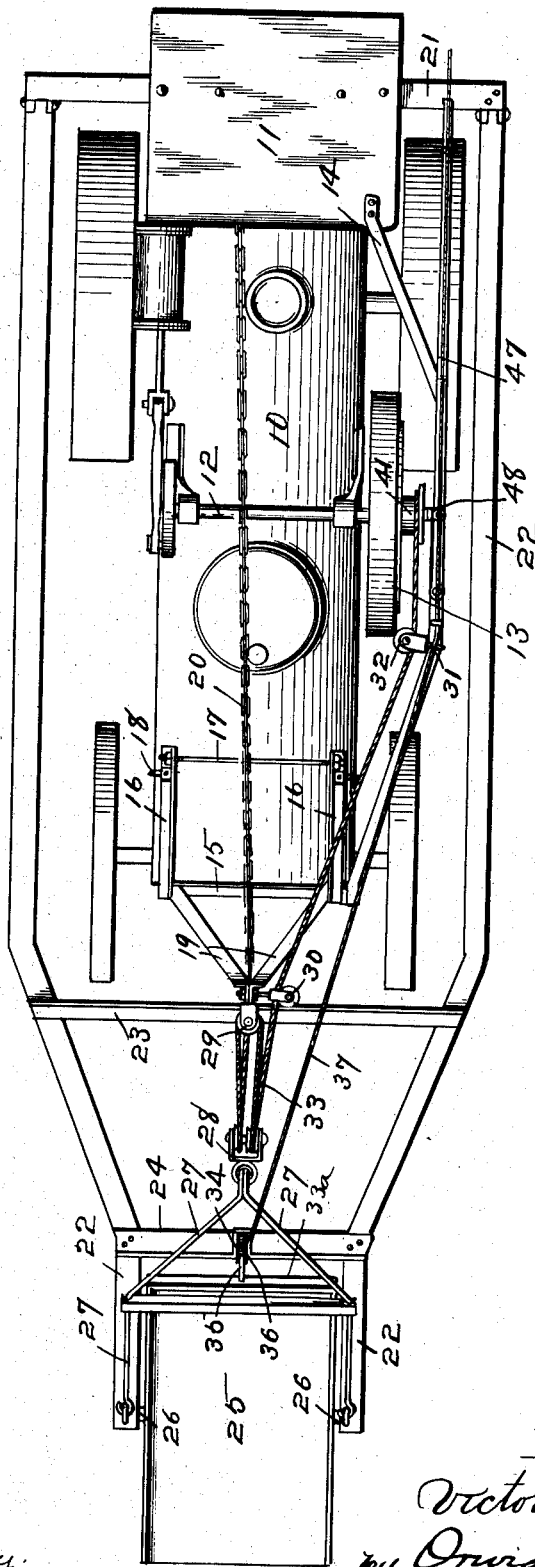

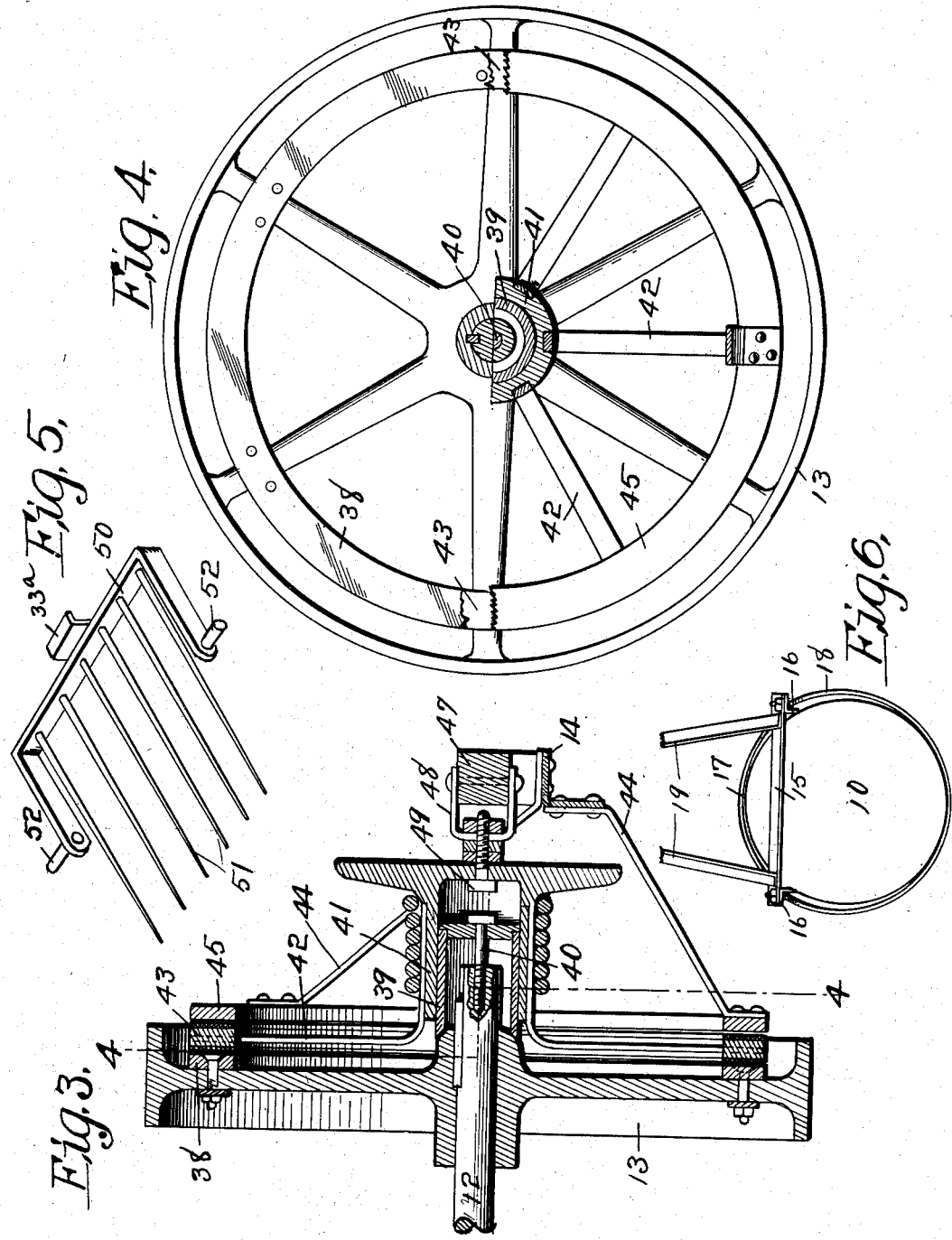

UNITED STATES PATENT OFFICE.

VICTOR LANDHOLM, OF WESTPOINT, NEBRASKA.

LOADER.

No. 878,641.   Specification of Letters Patent.   Patented Feb. 11, 1908.

Application filed January 14, 1907. Serial No. 352,207.

*To all whom it may concern:*

Be it known that I, VICTOR LANDHOLM, a citizen of the United States, residing at Westpoint, in the county of Cuming and State of Nebraska, have invented a certain new and useful Loader, of which the following is a specification.

The object of my invention is to provide a device of simple, durable and inexpensive construction designed to be quickly and easily attached to or detached from a traction engine and provided with a scoop so arranged that it may be filled by advancing the engine and arranged to be raised and lowered by means of a winding drum operated by the engine.

A further object is to provide improved means controlled by a single lever for elevating the scoop for securing it in any position of its adjustment and for permitting the scoop to lower by gravity and be easily stopped and held at any elevation.

My invention consists in the construction, arrangement and combination of the frame with the traction engine and in the construction of the means for controlling the winding drum, whereby the objects contemplated are attained, as hereinafter more fully set forth, pointed out in my claims and illustrated in the accompanying drawings, in which—

Figure 1 shows a side elevation of a device embodying my invention and applied to a traction engine. Fig. 2 shows a top or plan view of same. Fig. 3 shows an enlarged vertical, sectional view of the rope winding device. Fig. 4 shows a sectional view of same on the line 4—4 of Fig. 3. Fig. 5 shows a detail perspective view of a modified form of scoop, and Fig. 6 shows a detail front view of a part of the frame of the device.

Referring to the accompanying drawings, I have used the reference numeral 10 to indicate the engine boiler, 11 the rear platform, 12 the fly-wheel shaft and 13 the fly-wheel proper. These parts are of the ordinary construction and any of the traction engines now in use having said parts, may be used with my improvement.

The frame comprises a part 14 preferably made of structural metal fixed to the platform 11 and extended upwardly and then forwardly over the traction engine to the forward end thereof. At its forward end, it is connected to a cross piece 15 in front of the traction engine body near the upper portion thereof. This cross piece 15 has attached to it two short bars 16 to extend rearwardly along the side of the traction engine body near its top. These bars are supported in position by means of a rod 17 connected with their rear ends and passed over the engine body and a rod 18 connected with their rear ends and passed under the engine body. Each of these rods are screw-threaded at their ends and provided with nuts, whereby they may be firmly fixed in position.

Projecting upwardly and forwardly from the cross piece 15 are two converging arms 19 and these arms are braced by means of a chain 20 fixed to their upper ends and extended rearwardly and attached to a part of the traction engine.

Fixed to the rear platform 11 is a cross piece 21 with its ends projected beyond the sides of the platform. Two scoop bearing arms 22 are pivoted to this cross piece 21 and extended forwardly to a point beyond the forward wheels and there they converge and are provided with two cross pieces 23 and 24. Beyond the cross piece 24, the arms 22 are parallel. Pivoted between the forward ends of the arms 22 is a scoop 25 of ordinary construction provided with trunnions which are pivotally connected with the arms 22 in the rear of the central portion of the scoop so that the scoop will automatically tilt if released.

The numeral 27 indicates a bail fixed to the forward ends of the arms 22 and having a double pulley 28 attached to its central portion. On top of the arms 19, I have mounted a single pulley 29 and adjacent thereto a single pulley 30. On the frame 14 is a rod 31 having a pulley 32. A rope or cable 33 is attached at one end to the upper portion of the arms 19. Extended first around the pulley 28, then around the pulley 29, then again around the pulley 28, then around the pulley 30, then around the pulley 32 and its end is wound upon a drum, hereinafter described. By this arrangement when the drum is operated to wind the rope or cable thereon, the arms 22 containing the scoop will be elevated and when said rope or cable is released, these arms will be lowered.

I have provided for tripping the scoop so that its contents may be automatically discharged as follows: At the rear of this scoop is an angle plate 33ª and mounted upon the cross piece 24 adjacent to the rear of the scoop is a bracket having an arm projected rearwardly and upwardly. In front of said arm is a lever 35 pivoted to the bracket and formed with a notch to receive the angle plate 33ᵃ. An extensible coil spring 36 is mounted between the arm and the lever to yieldingly hold the lever in position with the angle plate 33ᵃ in the notch thereof. A rope 37 is attached to the top of said lever and is extended rearwardly to a point adjacent to the platform 11 where it may be conveniently reached by the operator. I have provided for winding up, releasing or holding the rope or cable 33 as follows: Fixed to the spokes of the fly-wheel 13 is an annular rim 38 having a flat outer face. Mounted upon the hub of the fly-wheel 13 is a cylinder 39 adjustably attached thereto by the bolt 40. Slidingly and rotatably mounted upon the cylinder 39 is a drum 41. Fixed to this drum is a number of arms 42 extended radially from the inner portion of the drum and having fixed to their outer ends an annular rim 43, the inner face of which is adjacent to the rim 38. Fixed to the frame 14 is a number of arms 44 supporting an annular rim 45 adjacent to and spaced apart from the outer face of the rim 43. Fulcrumed on top of the frame 14 is a lever 47 having a link 48 pivoted thereto extended laterally and connected by a bolt 49 with the drum 41. The rear end of this lever extends to a point above the platform 11 where it may be conveniently grasped by an operator. In use with this portion of the device and assuming that it is desired to elevate the scoop, then the operator moves the lever to force the drum 41 inwardly so that the rim 43 will engage the rim 38 and this will cause the drum to rotate in unison with the fly-wheel 13. If after elevating the scoop, it is desired to lower it, then the lever 47 is manipulated to bring the rim 43 to position between the rims 38 and 45, thus permitting the drum to freely rotate and unwind the rope or cable. The drum may be quickly stopped and firmly held in a stationary position at any point by moving the lever 47 as required to bring the rim 43 into engagement with the stationary rim 45.

In the modified form shown in Fig. 5, I have shown a scoop device especially designed for use in delivering long straw or the like and comprising the frame 50 having tines 51 fixed thereto and trunnions 52 at the sides of the frame to pivotally connect with the arms 22. At the rear of the frame 50 is an angle-plate 33ᵃ, the same as on the scoop shown in Fig. 1.

In practical use and assuming that it is desired to load a wagon with manure or the like, the scoop is placed in position close to the ground surface and the traction engine is bodily advanced to force the scoop under the pile of manure and thus load the scoop. After it is loaded, the operator manipulates the lever and causes the drum to wind up the rope or cable and thus elevate the scoop to position higher than the wagon bed to be filled. Then the traction engine is bodily moved to position where the scoop will stand directly over the wagon. Then the operator pulls the trip rope 37 and thus releases the scoop permitting it to turn upon its pivot and discharge its contents. Then the engine is backed, the process repeated until the wagon is filled. By means of the peculiar construction of the supporting frame of the device, it may be readily, quickly and easily attached to or detached from a traction engine and when it is desired to use the engine for other purposes, the operator may by removing a few bolts take the entire attachment from the engine.

Having thus described my invention, what I claim and desire to secure by Letters Patent of the United States, therefor is—

1. The combination with a traction engine, of an arm pivotally and detachably connected therewith and extended longitudinally of the engine beyond the end thereof, a dumping scoop pivotally connected with the free end of said arm, a frame detachably connected with the body of the traction engine, a rope winding device mounted on the engine, and operated thereby, a pulley supporting upright on said frame, and a rope or cable wound upon the winding device, passed over said pulley on the supporting upright and connected with the free end of the pivoted arm.

2. The combination with a traction engine, having an operator's platform, of two arms pivotally and detachably connected with said platform extended longitudinally of the engine beyond the end thereof opposite the platform, a dumping scoop pivotally connected with the free ends of said arms, a frame detachably connected with the body of the traction engine and also detachably connected with the said platform, a rope winding device mounted on the engine and operated thereby, a pulley supporting upright on said frame and a rope or cable wound upon the winding device passed over said pulley supporting upright and connected with the free ends of said arms.

3. The combination of a traction engine, arms pivoted thereto, a dumping scoop carried by said arms, a pulley supporting frame mounted on the traction engine, a fly-wheel mounted on the traction engine and operated thereby, a friction rim on the fly-wheel, a drum rotatably and slidingly mounted adjacent to the fly-wheel, a friction rim carried by the drum and fixed thereto, means for moving the drum so that its friction wheel may be moved into or out of engagement with the friction rim on the fly-wheel, and a rope or cable wound upon the drum passed over the pulley supporting upright and connected with said arms.

4. The combination of a traction engine, arms pivoted thereto, a dumping scoop carried by said arms, a pulley supporting frame mounted on the traction engine, a fly-wheel mounted on the traction engine and operated thereby, a friction rim on the fly-wheel, a drum rotatably and slidingly mounted adjacent to the fly-wheel, a friction rim carried by the drum and fixed thereto, means for moving the drum so that its friction wheel may be moved into or out of engagement with the friction rim on the fly-wheel, a rope or cable wound upon the drum passed over the pulley supporting upright and connected with said arms and a stationary friction rim supported adjacent to the outer face of the friction rim carried by the drum, said drum being also capable of movement so that its friction rim may engage the stationary friction rim.

5. The combination of a traction engine, arms pivoted thereto, a dumping scoop carried by said arms and means for raising and lowering the dumping scoop, comprising a fly-wheel mounted on and operated by the traction engine, a friction rim thereon, a drum slidingly and rotatably mounted adjacent to the fly-wheel, a friction rim fixed to the drum, a stationary friction rim adjacent to the friction rim carried by the drum for moving it toward or from the fly-wheel and a rope or cable wound upon the drum and connected with the dumping scoop.

6. The combination of a traction engine, two arms pivotally and detachably connected therewith, a dumping scoop carried by said arms, a manually operated trip device for the dumping scoop, a frame detachably fixed to the traction engine, an upright supported by said frame, a bail connected with the said arms, pulleys on the said bail and on the said upright, a fly-wheel mounted on the traction engine and operated thereby, a friction rim fixed to the fly-wheel, a stationary friction rim attached to said frame and supported adjacent to the friction rim on the fly-wheel, a drum rotatably and slidingly mounted adjacent to the fly-wheel and detachably connected therewith, a friction rim carried by the drum and arranged between the aforesaid friction rims, a lever fulcrumed to said frame, a link on said lever, a bolt fixed to the link and connected with the drum for moving the drum longitudinally and a rope or cable wound upon the drum and passed around the said pulleys.

7. In a device of the class described, a dumping scoop comprising a rear bar, forwardly projecting ends thereon, trunnions on said ends and a number of longitudinal tines fixed to the rear bar.

8. In a device of the class described, a dumping scoop comprising a rear bar, forwardly projecting ends thereon, trunnions on said ends, a number of longitudinal tines fixed to the rear bar, an angle-plate fixed to said rear bar and a spring actuated trip device to engage said angle-plate.

Des Moines, Iowa.

VICTOR LANDHOLM.

Witnesses:
C. HIRSCHMANN,
WM. GENTRUP.